Oct. 14, 1924.

P. S. ARNOLD 1,511,213

GEAR TOOTH ROUNDER

Filed Nov. 10, 1919    6 Sheets-Sheet 1

Inventor
PHILIP S. ARNOLD

By Charles E. Wines
Attorney

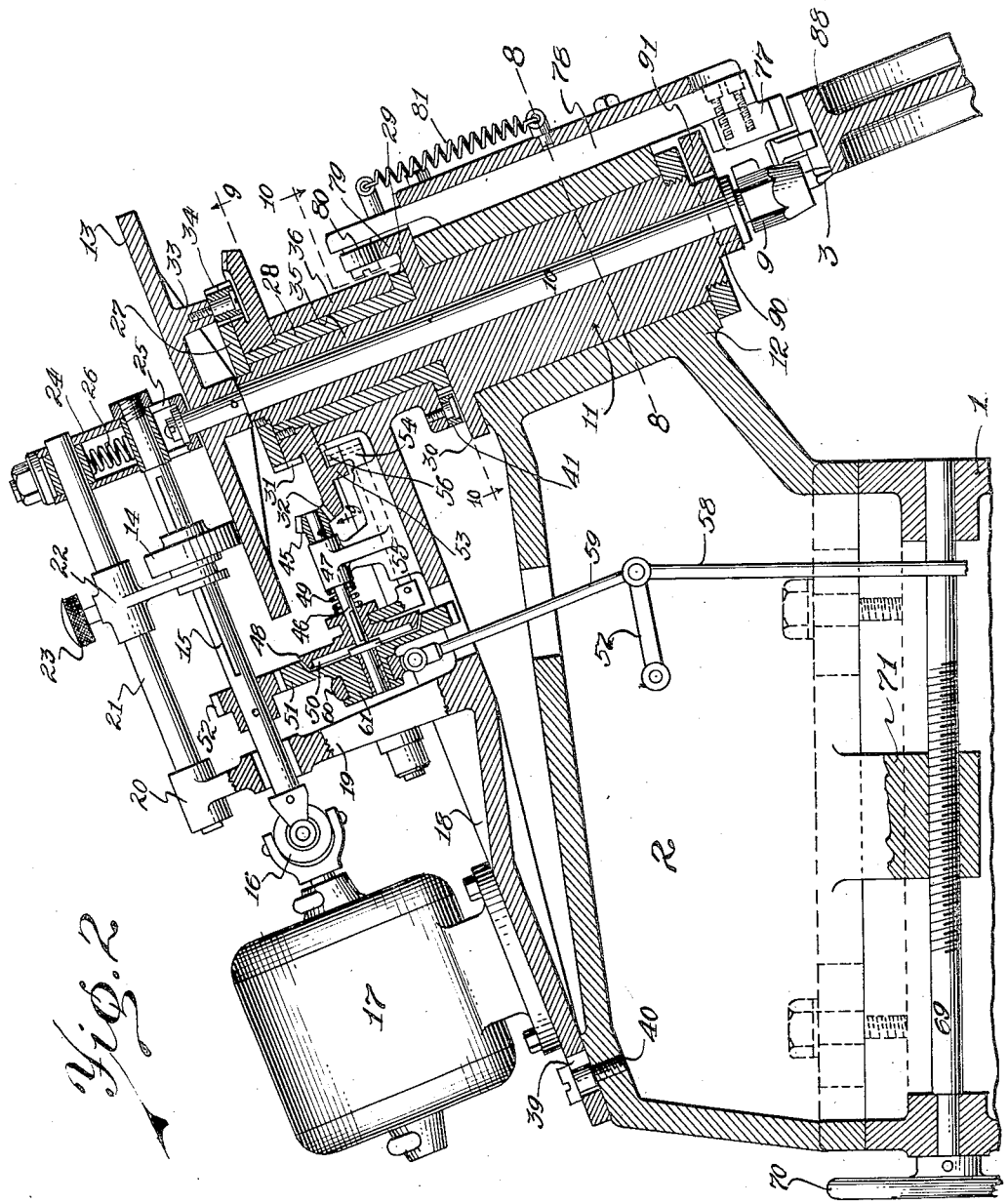

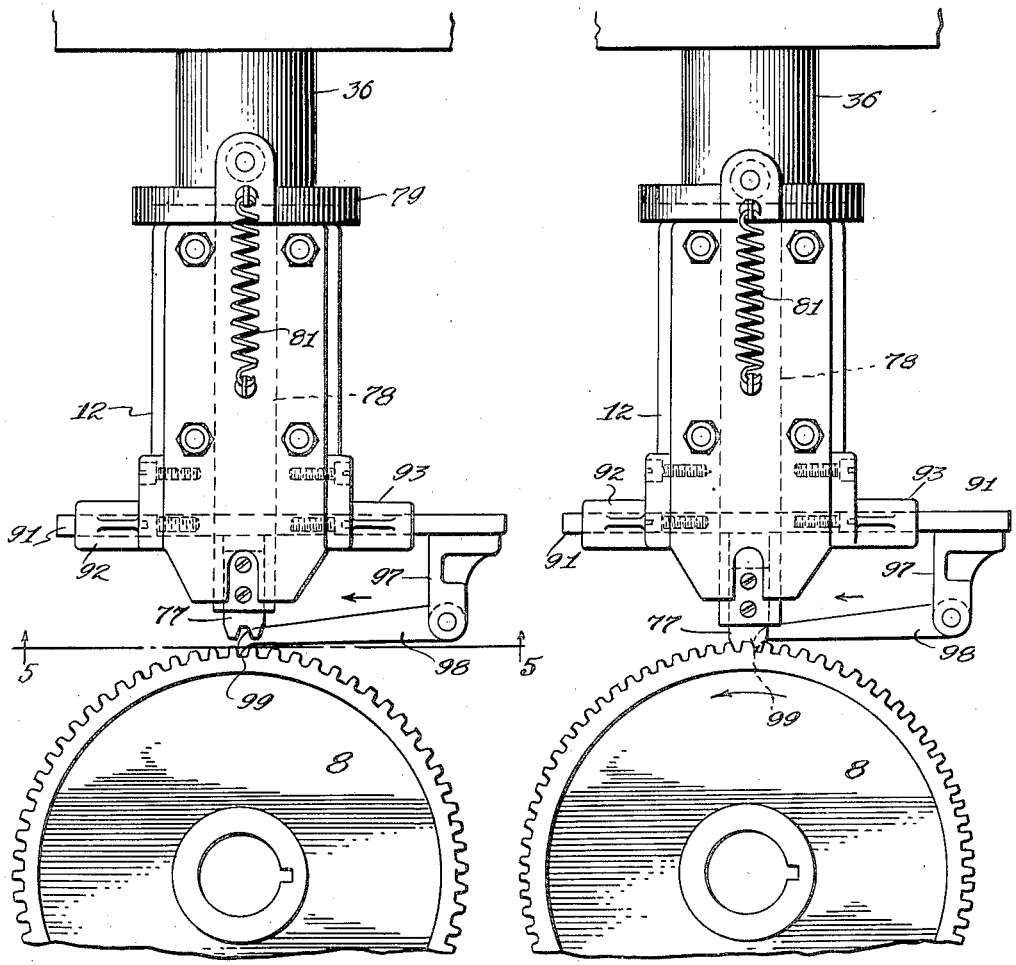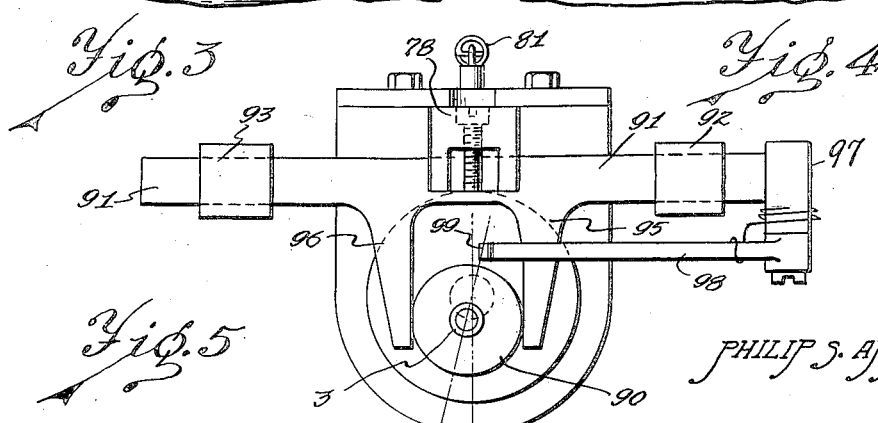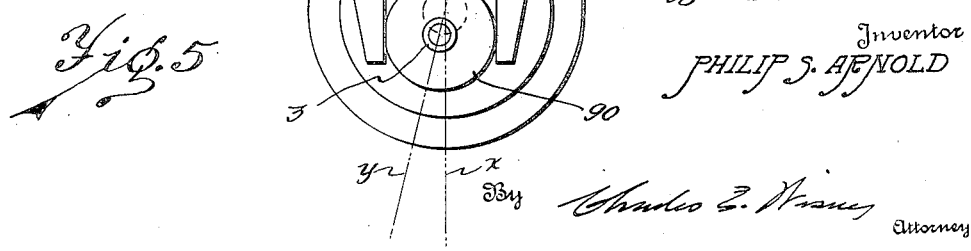

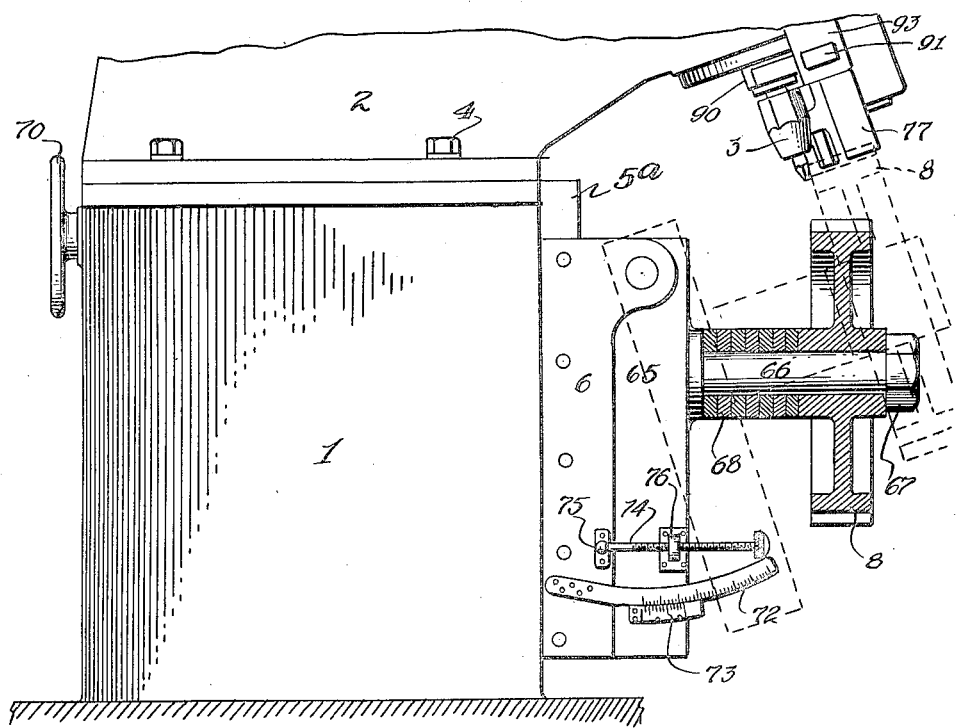
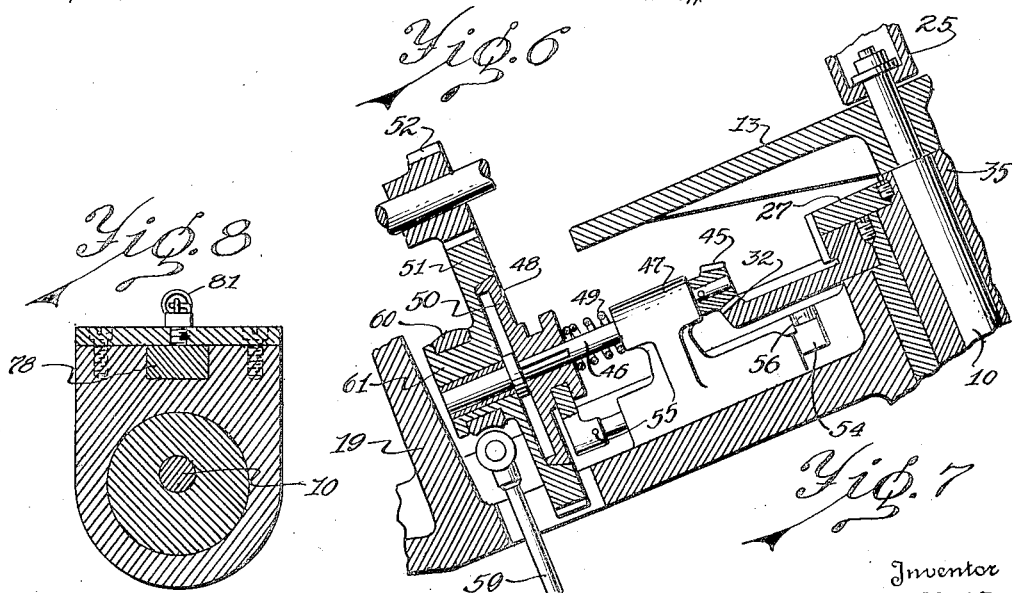

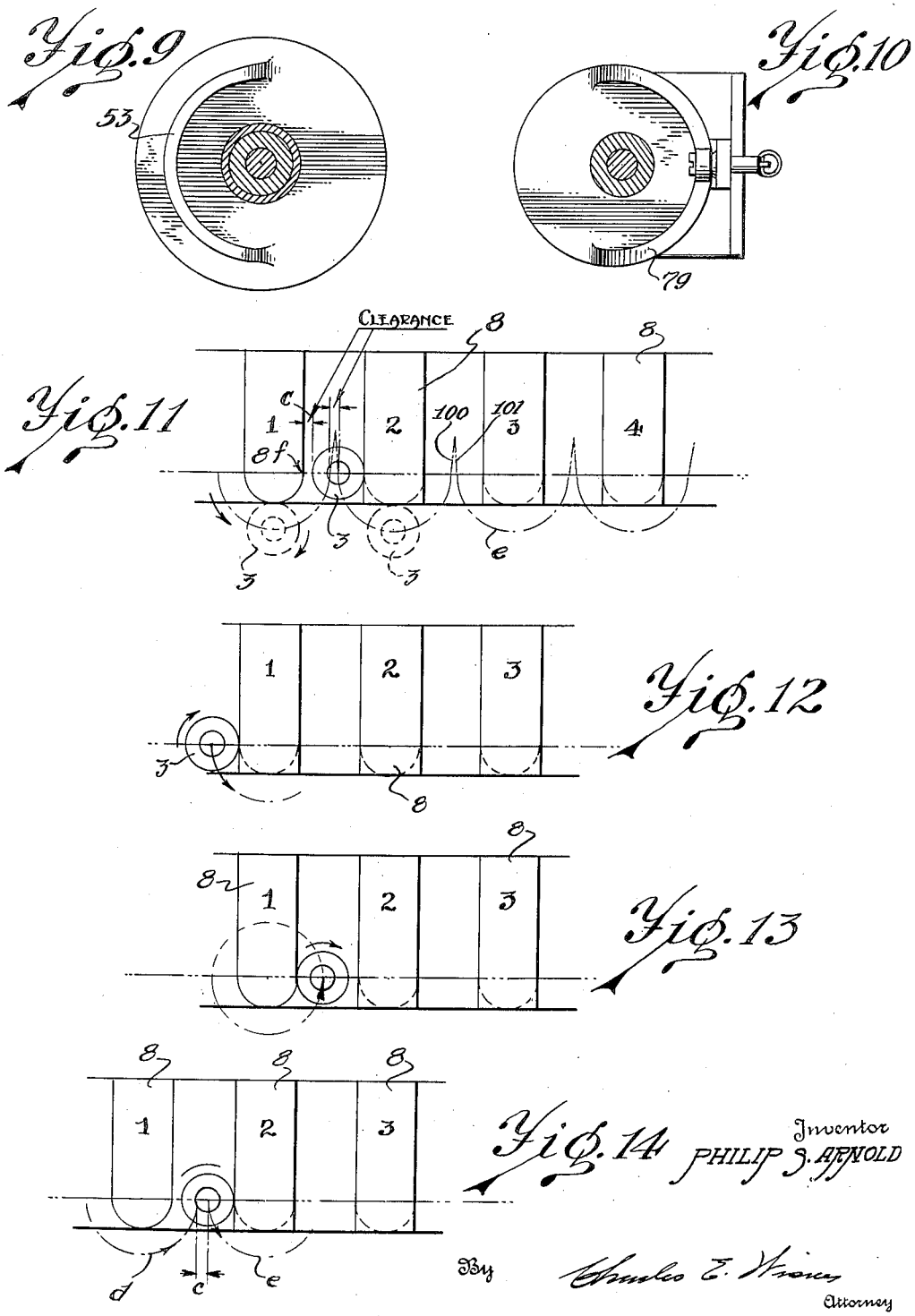

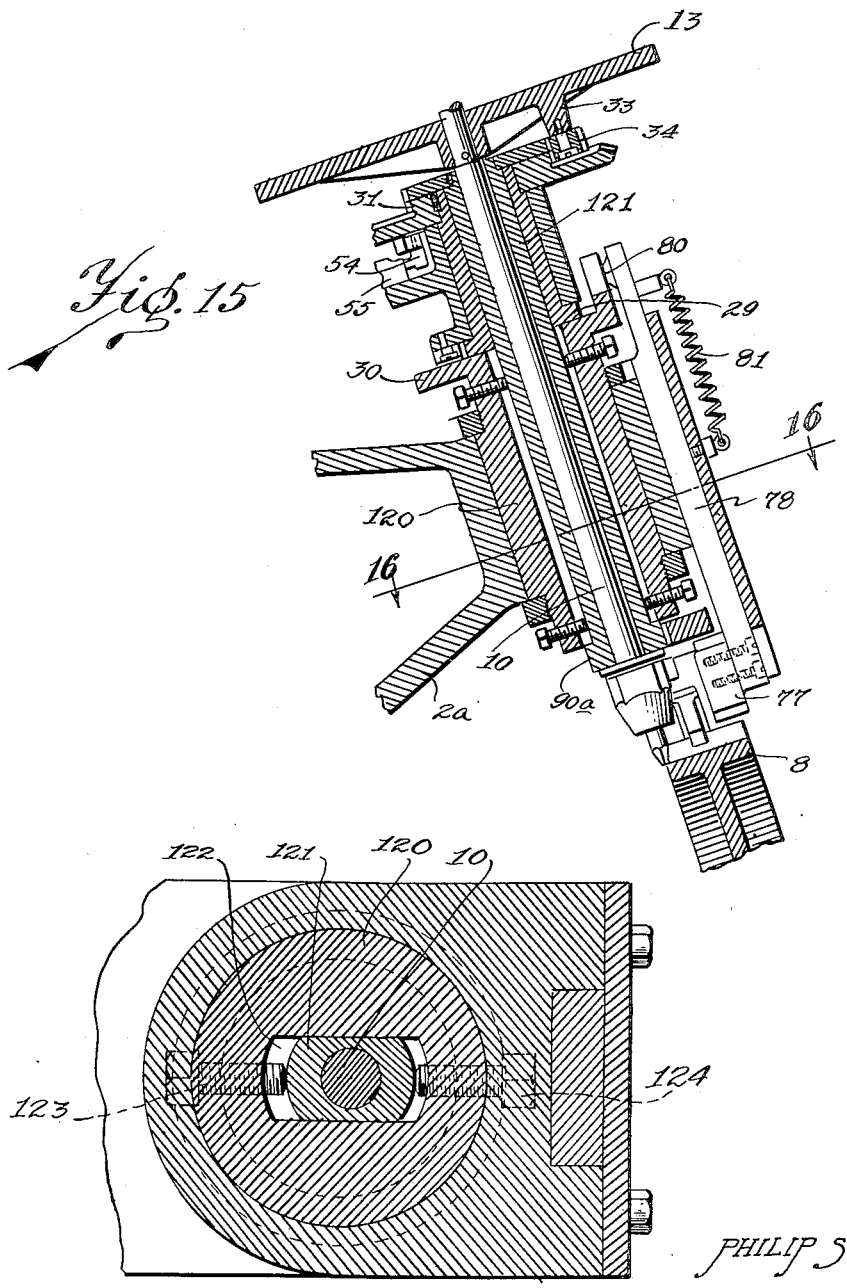

Patented Oct. 14, 1924.

1,511,213

UNITED STATES PATENT OFFICE.

PHILIP S. ARNOLD, OF HIGHLAND PARK, MICHIGAN, ASSIGNOR TO MILTON O. CROSS, OF DETROIT, MICHIGAN.

GEAR-TOOTH ROUNDER.

Application filed November 10, 1919. Serial No. 337,058.

*To all whom it may concern:*

Be it known that I, PHILIP S. ARNOLD, a citizen of the United States, residing at Highland Park, county of Wayne, State of Michigan, have invented a certain new and useful Improvement in Gear-Teeth Rounders, and declare the following to be a full, clear, and exact description of the same, such as will enable others skilled in the art to which it pertains to make and use the same, reference being had to the accompanying drawings, which form a part of this specification.

This invention relates to gear tooth rounding machines, and its object is to provide a simple and compact mechanism for rounding the ends of teeth of spur gears such as are used for instance in sliding gear transmissions in which the gears are moved on their longitudinal axes into mesh one with the other. More particularly, the object of the invention is to provide a mechanism in which the tool is turned about the end of the tooth in a circular path, the extended axis of which passes through the tooth approximately centrally between the sides to produce a truly circular end and to provide mechanism for holding the gear rigid during the cutting operation and to index the gear during that part of the movement of the tool in which no work is being performed. A further feature is involved in the method of and mechanism for indexing the gear during the idle movement of the tool.

Additional features are involved in the peculiar mechanism for holding the gear during the cutting operation and in accelerating the speed of movement of the cutting tool during its idle period. Another feature of the invention is involved in the means for supporting the work relative to the tool whereby the tooth may be rounded on an axis parallel with the side of the gear or at an angle thereto. I am aware of other mechanisms for rounding the ends of gear teeth as for instance such as is disclosed in U. S. patent to M. O. Cross No. 1,279,278 of September 17, 1918. In that case, however, the tool is made to oscillate about an axis passing through the tooth to be rounded, and this invention distinguishes therefrom particularly in that the tool while rotating upon its own axis is turned completely through a circular path about the same axis as in the device shown in the said Patent No. 1,279,278.

This invention also involves a construction of such character that the gear to be operated on is not necessarily retracted from or brought to the tool between successive cutting operations but may be held in fixed position whereby the tool after passing about the end of the tooth passes into the space between the dressed tooth and the succeeding tooth and thereupon the gear is moved or indexed to correspond with the speed of movement of the tool in passing from one side to the other of its circular path. These principal objects and the several minor objects of the invention are hereinafter more fully described and claimed and the preferred form of construction embodying my invention is shown in the accompanying drawings in which—

Fig. 2 is a vertical section of the operating head of the machine.

Fig. 3 is a plan view showing the gear holding and indexing head, the gear being in process of being indexed.

Fig. 4 is a similar view showing the gear held by the retainer for the cutting operation.

Fig. 5 is a section taken on line 5—5 of Fig. 3.

Fig. 6 is an elevation partly in section showing the gear holding means.

Fig. 7 is a detail in section showing part of the mechanism for operating the cutting tool.

Fig. 8 is a section through the cutter holder taken on line 8—8 of Fig. 2.

Fig. 9 is a detail in section taken on line 9—9 of Fig. 2, showing the cam controlling the mechanism for accelerating the speed of movement of the cutter.

Fig. 10 is a detail in section taken on line 10—10 of Fig. 2 showing the cam and rear end of the mechanisms controlling the movement of the retainer for the gear.

Fig. 11 is a diagram illustrating the relative movement of the tool about succeeding teeth of the gear.

Figs. 12, 13 and 14 are diagrammatic views illustrative of the movement of the gear relative to the tool.

Fig. 15 is a vertical section of the head showing a construction permitting adjustment of the tool radially of the holder.

Fig. 16 is a section taken on line 16—16 of Fig. 15.

Figure 1:
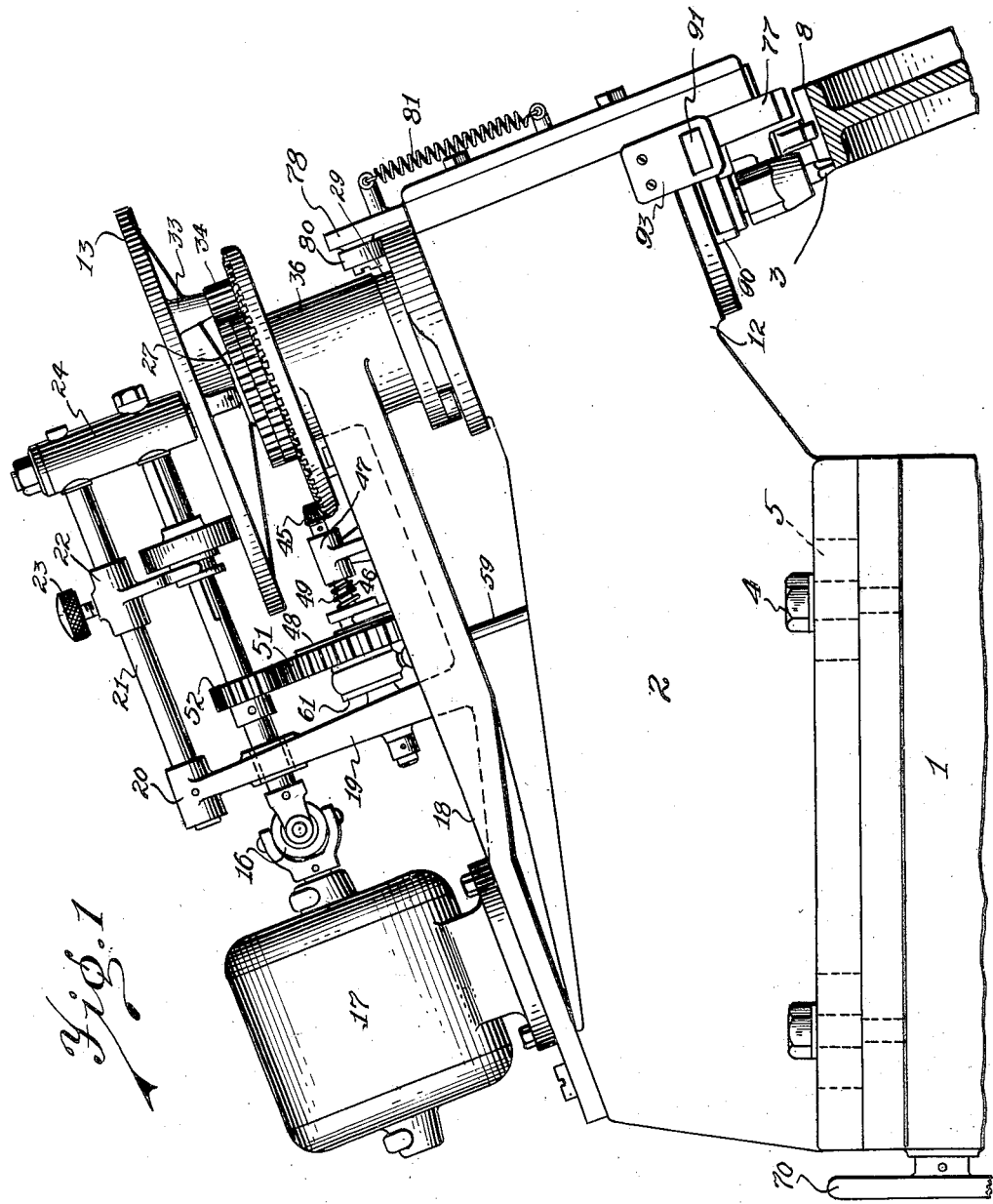
Fig. 1 is an elevation of the operating parts of a gear tooth rounder embodying my invention.

The mechanism and cooperative relationship of the several parts is first described. This consists of a base member 1 and a head 2 secured to the top plate thereof which carries a rotatable cutting tool 3 and driving mechanism therefor hereinafter described. The head 2 is bolted to the base 1 by means of the bolts 4 passing through slots 5 in the flange of the base by means of which the distance of the tool from the vertical side of the machine may be varied. As will be understood from Fig. 6 the vertical side of the machine is provided with ways 5ᵃ and a table 6 is mounted thereon and to be understood as being adapted to be adjusted vertically by any approved mechanism (not here shown). A gear 8 is supported on this table and to permit operation on gears of different heights and different lengths of hubs etc., the head 2 is made movable horizontally whereby the tool may be moved toward or from the ways 5ᵃ to accurate position to operate upon any particular gear.

The tool preferably utilized is conical in shape, the inclined angle between opposite sides being about twenty-nine degrees. The tool is therefore positioned with the axis thereof at an angle of about fourteen and one-half degrees from the vertical so that the face of the tool on the outer or right hand side from that shown in Fig. 6 is on the vertical line passing with the side of the gear when the said gear is positioned with the axis thereof in a horizontal plane as shown in full lines in Fig. 6. By this peculiar arrangement of the gear supporting table, the gear may be set at an angle to the vertical, as shown by the dotted lines in Fig. 6, by which means the end of the tooth may be rounded on an axis parallel with or at an angle to the plane of the gear. The cutting tool 3 is mounted in a chuck 9 on a drive shaft 10 which is supported in what I have termed a rotatable holder 11, the shaft 10 being eccentric to the axis of the holder 11. This holder 11 is rotatably mounted in bearings 12 formed at the right hand end of the head 2 and this holder 11 may be of a character in which the shaft 10 is held in fixed relative eccentricity or adjustable to the axis of rotation of the holder. At the rear end of the shaft 10 is secured a friction disc 13 driven by a friction wheel 14 on a rotatable shaft 15 connected through a universal joint 16 with the motor 17. This motor is mounted on a base 18 which has an upwardly extending arm 19 provided with an aperture for the shaft 15 and also having at the outer end thereof a boss 20 supporting a guide shaft 21 for the shifting arm 22 of the disc 14. The arm 22 is a forked arm engaging a groove in the hub of the disc wheel 14, which wheel is splined to the shaft 15 and driven thereby. By means of the binding screw 23 the member 22 may be secured in any desired position longitudinally of the guide shaft 21. The upper end of the guide shaft is inserted in a housing 24 held on the end of the shaft 10 but not rotatable therewith. The end of the shaft 15 also passes upward into this housing which is slotted at 25 to allow lateral movement of the shaft 15. A spring 26 is interposed between the ends of the shafts 21 and 15 in this housing 24 forcing the wheel 14 into contact with the friction disc 13 which permits of necessary lateral movement of the shaft to hold the wheel 14 in engagement with the disc 13 and universal joint connection 16 with the motor permits the driving of the shaft even when out of alignment with the motor shaft. The shaft 15 extends through an aperture in the arm 19 of sufficient diameter to permit lateral movement of the shaft. By rotation of this wheel 13 through the mechanism described, the shaft 10 and cutting tool 3 are rotated and at any desired speed determined by the setting of the wheel 14. The friction drive described, however, may be dispensed with and a positive drive utilized of any approved type when it is not desired to vary the speed of rotation of the shaft 10 and cutting tool thereon.

To rotate the holder 11 I have provided at the upper end thereof adjacent the disc 13, a spur gear 27 secured thereto. On this upper end of the holder (which preferably is less in diameter than the body thereof as shown) is a sleeve 28 terminating at the lower end in a toothed flange 29 practically in contact with a flange 30 formed on the body of the holder between the parts of large and small diameter. This sleeve 28 at the upper end thereof has secured thereto a two-part gear member comprising a spur gear 31 and a bevel gear 32 of greater diameter. The gear 31 is of the same diameter and lies practically in contact with the spur gear 27 attached to the holder. The disc 13 is provided with a downwardly extending boss 33 on the end of which is rotatably mounted an idler spur gear 34 having a width of face practically equal to the width of the faces of both the gears 31 and 27 and meshing with both the said gears. The gear 31 has one less number of teeth, however, than the gear 27 so that in a single rotation of the disc 13 and spur gear 34 secured thereon about the gears 27 and 31 due to the differential movement of the gears 27 and 31 causes a slow rotation of the holder member 11. By continued rotation of the disc therefor the shaft 10 is rotated at comparatively high rate of speed while the holder itself is rotated at slow speed which will be here termed the feeding movement and the gear is thus rapidly rotated about its own axis and turns comparatively slowly about an axis eccentric thereto making a complete circle. It is to be noted that the holder 11 is in a fixed bearing, and that the small end 35 of the holder 11 on which the sleeve 28 is mounted has an axis coinciding with the axis of the shaft 10 and thus this part 35 will have a circular path of movement. This sleeve 28 and part 35 of the holder are within a bearing 36 formed integral with the motor base 18 and, due to this circular movement of the portions 28 and 35 the base 8 is made to move backward and forward on the head. For this purpose I have provided a slotted aperture 39 at the end of the base opposite the bearing 36 through which is placed a screw 40 extending into the head 2. This arrangement permits the necessary slight movement of the base 18 relative to the head while the driving mechanism on the base is in fixed relative relation. The gear 29 is in mesh with an idler gear 41 supported on the end of the housing 36 and is merely a retarding gear to hold the sleeve 28 from rotating more rapidly than is required by the driving gear 34.

This arrangement of the gears 27 and 31 on the holder 11 and sleeve 28 respectively and driving gear 34 is a well known mechanical arrangement having been heretofore used in other mechanisms and, by arranging the gear 27 with 61 teeth the gear 31 with 60 teeth, each revolution of the gear 34 thereabout turns the holder forward the distance of one tooth and it would therefore require sixty revolutions of the friction wheel 13 to produce one revolution of the holder. This turning of the holder determines the speed of feed of the cutting tool and, as shown in Figs. 1 and 2, this speed of revolution of the holder may be uniform throughout the entire circle of movement of the tool by elimination of the bevel gear 32. However, as the period of the cutting operation is only throughout approximately one-half of the circle of movement of the cutter (as hereinafter more specifically shown) the remaining half circle of its movement may be accelerated for which purpose the bevel 32 is utilized. This bevel gear 32 meshes with a bevel pinion 45 secured to a shaft 46 supported in bearings in the arm 19 at one end and the bearing 47 adjacent the other end. On this shaft 46 is splined a coned clutch 48 and a spring 49 is interposed between the clutch and the bearing 47 tending to force the clutch into engagement with its companion 50 formed in the side of the spur gear 51 which is rotatably mounted on the shaft 46. This gear 51 meshes with a pinion 52 on the shaft 15. With the clutch out of engagement as is indicated in Fig. 2, the shaft 15 is driven normally by the motor 17. The clutch 48 is held out of engagement by means of a cam 53 on the rear side of the bevel gear 32 shown in elevation in Fig. 9. A sliding member 54 is provided riding in a bearing 55 on the base 18 and at the upper end is provided with a roller 56 beneath which the cam 53 rides during the revolution of the gear 32. This cam in riding under the roller lifts the clutch out of engagement with the gear and, as the roller rides off from the cam the clutch suddenly drops into engagement with its companion in the gear 51 and, due to the high speed revolution of the shaft 46, accelerates the speed of rotation of the shaft 15. Thus, during the interval in which the clutches are in engagement the speed of movement of the tool about its circular path is accelerated and the movement of the tool about its circular path is comparatively slow during half of the revolution and comparatively rapid during the remaining half which is the idle period. A pump operating mechanism is shown which is to be understood as being connected with an oil pump of any approved type for forcing oil to the various parts and this consists of a rock arm 57 to which is pivoted the pump operating arm 59. At the forward end the driving arm is provided with an eccentric band 60 riding on the eccentric 61 formed on the gear 50. By this eccentric and strap therefor the pump operating rod 58 is caused to reciprocate.

As heretofore stated the gear to be operated on is supported on a table 6 movable vertically on ways 5ª provided on the side of the base 1 and the tool operates around the end of the tooth adjacent the table as will be understood from Fig. 6. This table has a hinged part 65 mounted thereon having a stud 66 extending outwardly therefrom and threaded at one end to receive a retaining nut 67 and this stud 66 supports the gear 8 and the gear may be approximately positioned thereon by use of shims 68 interposed between the gear hub and the base 65. The relative position of the gear to the cutter may be accurately fixed through the mechanism utilized to move the head 2 horizontally on the base. This mechanism, as shown in Fig. 2, consists of a screw shaft 69 provided with a hand wheel 70 exteriorly of the case and extending through a threaded lug 71 attached to the head 2. By turning this hand wheel the head may be moved transversely of the table to accurately position the tool relative to the gear. The hinged base member 65 may be set at any desired angle to the vertical, and indicated by dotted lines in Fig. 6, to permit the rounding of the ends of the tooth on an axis at an angle to the plane of the side of the gear. Thus the tooth may be rounded either with the said ends being coned with the tooth end sloping backward from the side of the gear or with the tooth rounded cylindrically and of full width.

Any desired mechanism may be utilized to set the table 65 at the desired angle but the mechanism utilized must be of the most solid and substantial construction sufficient to hold the gear as nearly rigid as is mechanically possible. I have suggested a means for varying the angle of the member 65 consisting of a vernier 72 fixedly secured to the base 6 and a corresponding graduated member 73 fixed to the member 65 whereby an accurate reading may be had of the angle at which the gear is to be positioned. I have provided a threaded rod 74 having a ball end and socket bearing 75 therefor on the stationary member 6. The rod extends through a threaded lug 76 on the member 65. By turning this rod 74 the member 65 may be positioned at the desired angle. It is to be noted that, in the construction here shown, the gear when once positioned remains in such position in fixed relation with the tool and is not moved forward or backward between the cutting operations as is ordinarily done, it being understood of course that the gear is turned upon its axis for operation upon succeeding teeth and the axis is fixed when the gear has once been positioned for operation.

It is essential that the tooth be positioned with precision relative to the cutting tool so that the axis about which the tool is turned passes centrally through a tooth equidistantly between the sides thereof in all instances where a truly rounded end of the tooth is desired, but it is to be further understood that, in the event it is desired to cut a tooth to a greater degree upon one side than the other, the tooth should be positioned so that the axis about which the tool is turned passes through the tooth nearer to one side than the other. This is to be accomplished through an indexing mechanism and holding device for the gear which accurately positions the gear. For this purpose I provide what I have termed the retainer 77 which is formed with teeth complemental to that of the gear to be cut and which is insertable into the teeth of the gear above the cutter as will be understood from Figs. 2 and 6. This retainer 77 is attachable to a bar 78 and, by making the retainer detachable, as shown, retainers with teeth of various sizes and pitch may be provided enabling the device to operate upon gears of various sizes of teeth. The bar 78 is reciprocable in a way provided at the end of the bearing member 12 of the head 2 and is reciprocated to withdraw the sector or retainer from the gear at the time the gear is being indexed and moved into engagement with the gear at the beginning of the cutting operation. For the purpose of moving the sector in the required manner I provide a cam 79 on the flange 30 of the holder 11 as shown in Figs. 2 and 10. This cam is substantially a half circle and withdraws the sector by riding behind a roller 80 provided at the rear end of the bar 78. The spring 81 is utilized to force the sector into engagement with the gear when the roller is released by the cam.

From the above described mechanism it becomes evident that the cutting tool both rotates upon its axis and is turned in a circular path about an axis eccentric thereto. The tool as is evident from the description is utilized to round the ends of the teeth and gear and in the case where the sector positions the tooth with the axis about which the tool turns passing equidistantly between the sides of the teeth, the ends of the teeth will be formed in a half circle and depending upon the manner in which the gear is positioned as shown in Fig. 6, the cut will be of a character of the side of a cone when the gear is positioned at an angle and, when positioned with the plane occupied by the side of the gear passing through the cutting face of the tool, the tooth has the form of a cylinder. These varying shapes forming a cone of greater or less angularity of side to that of the cylinder are secured solely by the positioning of the gear, the tool always traveling in the circular path as heretofore described. This path of movement of the tool relative to the ends of the teeth is shown graphically in Fig. 11 by dotted lines, the tool, indicated at 3 by dotted lines, is rotating to the right and is turned from right to left in a circular path about the ends of the tooth 1 for instance and at the finish of the cut is positioned between the teeth 1 and 2 of the gear 8. It is to be noted that there is a slight clearance and that the tool moves free from the tooth upon finishing its cut. This is accomplished by the indexing mechanism hereinafter described which is of such character that upon completion of its idle movement the tool is brought to cutting position relative to the succeeding tooth 2. The diagram Fig. 11 shows graphically the cutting operation of the tool about each tooth and is drawn as though the gear was stationary and the tool moved successively about the ends of the teeth as shown by the dotted line e. By means of the indexing mechanism the relative path of the tool is as shown in this figure, and due to the necessary clearance of the tool between the teeth, the result is much the same as if the tool upon finishing the cut upon a true radius from the point f of the tooth 1 continues on a tangent to a point equidistant between the two teeth and returns on a tangent to the half circle of its movement during the cutting operation about the succeeding tooth 2.

In reality the tool revolves in a perfect circle about a fixed center and the teeth are brought successively to be operated upon by the tool and this actual relationship of the tool and gear teeth is shown graphically in Figs. 12 to 14 which are positioned in the relative successive relationships of the gear and tool in vertical relation one over the other. In Fig. 12 the tool 3 is starting upon the cutting operation about the end of the tooth 1. In Fig. 13 the tool has finished the cut and is positioned between the teeth 1 and 2. The tool, however, after finishing of the cut continues the circular path shown by dotted lines in Fig. 13 and, during this period of movement, the gear is indexed and the tooth No. 2 brought forward to the position occupied by the tooth 1 in Fig. 13 as will be understood from Fig. 14. In moving the gear to position the tooth 2 as stated, the indexing mechanism takes up the clearance between the tool and tooth 2 as indicated in Fig. 13 bringing the tooth to cutting position with the tool at the time it reaches cutting position and this operation is continued till all of the teeth have been formed. Thus, it is possible to hold the gear on a fixed axis relative to the tooth during the entire period of operation, the gear being indexed at a speed corresponding with the speed of movement of the tool in completing the idle half of its path of movement. As heretofore stated, the movement of the tool about this half of the circle is accelerated and the indexing mechanism is of a character to turn the gear to correspond to whatever speed of movement the tool may have during the idle period.

Manifestly, the gear could be withdrawn from this relative position with the tool and indexed and returned in time for operation of the tool on a succeeding tooth as has ordinarily been the practice throughout a complete circle. I prefer, however, to hold the gear rigidly in its operative relation with the tool as described and to index the gear while the tool is positioned between the teeth thereof. For the purpose of thus indexing a gear I provide mechanism shown particularly in Figs. 5 and 2. In these figures it will be observed that the shaft 10 of the cutting tool projects through the forward or lower end of the holder 11 which has a cylindrical portion 90 at that end, the center of which coincides with the longitudinal axis of the shaft 10 and is thus eccentrically positioned relative to the axis of rotation of the holder 11, the eccentricity of the part 90 being equal to that of the shaft 10. Positioned above this portion 90 is a reciprocably mounted bar 91 carried in bearings 92 and 93 on opposite sides of the head 12. This bar as shown in Fig. 2 is at the rear of the sector 77 and beneath the actuating bar 78 therefor. The bar 91 has two depending arms 95 and 96 riding in engagement with opposite sides of the part 90 of the holder 11 and, due to the eccentricity of this part 90 relative to the center of rotation of the holder, rotation of the holder causes the bar 91 to reciprocate in its bearing and the extent of this reciprocation by reason of the fact that the axis of the cutter 3 is exactly on the center of the part 90, the extent of movement of the bar 91 will be equal to the diameter of the circle traversed by the cutter and, therefore, approximately equal to the width of the tooth at the pitch line.

This bar 91 is utilized to index the gear as will be understood from Figs. 3 and 5. A bracket 97 is secured to one end of the bar and extends forwardly therefrom. On this bracket is pivotally mounted a pawl 98 provided with an ordinary spring to hold the toothed end 99 thereof in engagement with the teeth of the gear 8. The forward end of this toothed end 99 conforms substantially to the side of a tooth and the rear side of this end is inclined as shown so that on movement of the bar 91 in the direction of the arrow shown in Fig. 3, the gear is turned and the pawl rides over the teeth on movement in the reverse direction. At the completion of this indexing movement and approximate positioning of the gear, the cam 79 runs from beneath the roller 80 of the sector bar and the sector 77 is projected forward under the impetus of the spring 81 into engagement with the teeth of the gear as indicated in Fig. 4 which holds the gear rigidly during the time the cutter is traversing the lower half of its circular movement and dressing the end of the tooth. This turning of the tool through the half circle moves the bar 91 backward from the position shown in Fig. 4 between the next succeeding teeth of the gear and as the working cut is finished and the sector withdrawn form the gear, movement in the direction of the arrow shown in Fig. 3 brings the next tooth to position.

As has been previously stated, the cutter must clear the tooth upon completion of its cut. Therefore, the cam for moving the sector is designed to withdraw the sector from the gear a very slight interval before or just as the tool is completing its half circle of cutting movement and the gear is started on its indexing movement just as the cutter finishes the half circle and to prevent the cutter (which is traversing a circular path) from cutting into the side of the tooth during what has been termed the idle half of its movement, the tooth must be moved slightly ahead of the movement of the cutter in its idle movement. To accomplish this, the circular portion 90 of the holder 11 heretofore described is offset to a slight extent relative to the tool as will be understood from the diagram in Fig. 5, in which the vertical line passes through the center of the cutter and the center of rotation of the holder and the line y passes through the center of the member 90 and the center of rotation of the holder. The line y is about five degrees in advance of the cutter relative to the direction of rotation of the cutter and, as will be noted, the center of the tool and center of the member 90 traverse the same circular path. This relationship of the member 90 to the cutter thus causes the arm 91 to be started in its reciprocable movement just slightly ahead of the time when the cutter starts upon its idle half of the movement. This provides for clearance of the cutter between the teeth of the gears causing the tooth being operated upon to be moved slightly away from the cutter as it finishes the cut and causes the next succeeding teeth to be moved to position to be operated upon on the completion of the idle movement and beginning of the cutting movement thereon. From this description the diaphragm Fig. 11 will be understood, the relative position of the member 90 and the cutter 3 to the center of rotation of the holder causing the tool to relatively take a path tangential to the half circle of the cutting movement which is indicated by the two dotted lines 100 and 101 in the said figure. In the diagrams Figs. 12 to 14 this clearance is indicated by the space c of Fig. 11, the dotted half circle traversed during the cutting of the tooth 1 and the dotted half circle e showing the new relative position of the tool for cutting the end of the tooth 2, it being understood of course that the tool traverses a true circle, and that the clearance indicated at c in Fig. 14 is provided for in the indexing mechanism as above described.

In the construction shown in Figs. 1 and 2 the eccentric relationship of the tool shaft and the holder 11 therefor is fixed. For the cutting of the various sizes of teeth, however, it is necessary to adjust the distance of the center of the tool shaft from the center of rotation of the holder and any approved mechanism may be utilized for this purpose as for instance such as shown in the U. S. Patent to M. O. Cross, No. 1,279,278, or similar construction is here shown in Figs. 15 and 16.

In Fig. 15 the holder 120 is rotatable in the head of the base member 2$^a$ and this holder, as shown in Fig. 16, has what I have termed a support 121 through which the shaft 10 of the cutting tool extends. This support 121 is positioned in an aperture 122 in the holder and is radially movable in the elongated aperture provided therein by means of two sets of adjusting screws 123 and 124 on opposite sides thereof whereby the position of the center of rotation of the tool may be adjusted eccentrically to the center of rotation of the holder 120 and thus vary the diameter of the circular path of movement of the cutting tool to accord with the linear pitch of the gear to be operated upon. This construction is identical in all general respects with that previously described, but it is to be noted that the circular portion 90$^a$ through which the indexing mechanism is operated is on the support 121 rather than being part of the holder proper so that as the tool is adjusted the portion 90$^a$ is correspondingly adjusted and the indexing mechanism made to correspond exactly in movement to that required by the character of the gear being operated upon. It is further to be noted that this supporting member 121 extends outwardly through the upper end of the holder 120 and that on this portion is provided the driving mechanism in all other respects the same as that described and shown in Fig. 2. The support 121 having the flattened sides and engaging in the aperture 122, the turning of the member 121 at the rear end rotates the holder and causes the tool to traverse the circular path.

Having thus described my invention, what I claim and desire to secure by Letters Patent of the United States is—

1. In a machine for rounding the ends of gear teeth, a rotatable cutting tool, means for causing the tool to traverse a complete circle, and a gear holder adapted to position the gear with the axis thereof at any one of various angles to the axis of the circle traversed by the tool and with the end of the tooth to be operated on within the path of movement of the tool.

2. In a machine for rounding the ends of gear teeth, a rotatable cutting tool, a rotatable holder therefor, the axis of the tool being eccentric to the axis of the holder, means whereby the rotating tool is carried through a complete circle, means for positioning a gear with the axis thereof at an angle to the axis of rotation of the holder with a tooth thereof within the path of movement of the tool, and means for varying the angle of the axis of the gear relative to the axis of rotation of the holder.

3. In a machine for rounding the ends of gear teeth, a rotatable holder therefor, a rotatable cutting tool positioned eccentric to the axis of rotation of the holder whereby the rotating tool is carried through a complete circle, means for positioning a gear with the axis thereof at any one of a number of predetermined angles to the axis of the holder and with the end of a tooth within the path of movement of the tool, the tooth being rounded by the tool during movement thereof part of its orbit, and means for indexing the gear during the period the tool is traversing the remainder of its orbit.

4. In a machine for rounding the ends of gear teeth, a cutting tool, a rotatable holder therefor, the tool being positioned eccentric to the axis of the holder whereby the tool is made to traverse a complete circle, means for positioning a tooth of the gear on the extended axis of rotation of the holder, the tool passing from the space between teeth on one side of said tooth to the space on the other side and rounding the end of the tooth during such movement, and indexing means operable in advance of the tool movement to clear the tool from the tooth and to position the next tooth for the cutting operation.

5. In a machine for rounding the ends of gear teeth, a rotatable cutting tool, a rotatable holder therefor, the axis of the tool being eccentric to the axis of the holder causing the tool to traverse a complete circle, means for positioning the gear with a tooth thereof in position for engagement by the cutter with the end thereof during practically half the circle of cutter movement, means for indexing the gear operating slightly in advance of the tool to draw the tooth away from the tool at about the completion of its half circle of cutting movement and positioning a succeeding tooth for engagement with the tool just previous to the completion of its idle half circle of movement.

6. In a machine for rounding the ends of gear teeth, a cutting tool, a rotatable holder therefor, the axis of the tool being eccentric to the axis of the holder whereby the tool is caused to traverse a complete circuit continuously in one direction, means for positioning the gear with a tooth thereof on the extended axis of the holder, the gear being axially fixed in relation to the tool, means for positioning a gear at any of various angles to the tool, and means for indexing the gear operating to withdraw the tooth from the tool just previous to completion of its cutting half circle of movement, moving the gear with the tool to index the same at the speed of rotation of the tool during its idle half of movement and while out of engagement with the teeth of the gear and finally and bringing the next tooth to cutting position just as the tool completes its idle half circle of movement.

7. In a machine for rounding the ends of gear teeth, a cutting tool, a rotatable holder therefor, the tool being positioned eccentrically to the axis of the holder whereby the same is made to traverse a complete circle, means for positioning the gear in axially fixed relation to the tool with the extended axis of the holder passing practically equidistantly between the sides of the tooth adjacent one end thereof whereby the tool engages the tooth during substantially half its orbit, and indexing means for the gear moving the tooth free from the cutting tool just as it completes its half circle of cutting movement and moving the gear at the same speed of movement as that of the tool during the greater part of its idle half circle of movement.

8. In a machine for rounding the ends of gear teeth, a cutting tool, a rotatable holder for the cutting tool, means for continuously rotating the holder in one direction, the tool being positioned eccentric to the axis of the holder, means for positioning a gear with a tooth thereof on the extended axis of the holder with the axis of the gear at any one of various angles to the axis of the holder, means for approximately indexing the gear, and a retainer for the gear having spaced teeth complemental to that of the gear and engaging the gear teeth subsequent to the indexing to fixedly hold the gear during the cutting operation.

9. In a machine for rounding the ends of gear teeth, rotatable cutting tool, means for turning the tool about a complete circle of a diameter substantially equal to the linear pitch of the gear, means for positioning the gear with the extended axis of the holder passing equidistantly between the sides of a tooth with the axis of the gear at any one of the various angles to the axis of the holder, indexing mechanism operable subsequent to the cutting operation on each tooth, a retainer having a toothed face complemental to the gear teeth adapted to engage the tooth and fixedly hold the gear during the cutting operation, and means for withdrawing the retainer from engagement with the gear during the indexing operation.

10. In a machine for rounding the ends of gear teeth, a cutting tool adapted to be turned about a complete circle having a radius substantially equal to half the linear pitch of the gear, means for positioning a gear for the cutting operation, means for indexing the gear of said indexing means operating in advance of completion of the cutting movement of the tool to free the cutter from the tooth as it completes its cutting movement and positioning a succeeding tooth for the cutting operation previous to completion of the idle movement of the tool, a retainer having teeth complemental to the teeth of the gear engaging the gear during the cutting operation, and means for withdrawing the retainer from engagement with the gear during the indexing operation.

11. In a machine for rounding the ends of gear teeth, a cutting tool, means for turning the tool about a complete circle, the diameter of which is substantially equal to the linear pitch of the gear, the tool rounding the end of the tooth during substantially half of its movement, and means for indexing the gear during the time the tool is traversing the remaining part of its circle said indexing means being set to operate in advance of completion of the cutting movement of the tool.

12. In a machine for rounding the ends of gear teeth, a cutting tool, means for turning the tool through a circle, the tool in passing from one side to the other of the tooth rounding the end thereof on a radius substantially equal to half the thickness of the tooth at the pitch line, means for positioning the gear with the axis thereof in fixed relation to the tool, and means for indexing the gear, said means operating just previous to completion of the half circle of the cutting movement of the tool, the indexing movement of the gear corresponding to the speed of movement of the tool through the idle half circle of its movement.

13. In a machine for rounding the ends of gear teeth, a rotatable cutting tool, a rotatable holder therefor, the axis of rotation of the tool being eccentric to the axis of rotation of the holder whereby the tool is caused to traverse a circular path, means for positioning the gear for the cutting operation, the extended axis of rotation of the holder passing through the tooth substantially equidistantly from each side between the ends thereof, the tool passing between adjacent teeth on completion of the cutting half of its movement, means for turning the gear slightly in advance of the movement of the tool to clear the same from the tooth at about the completion of the cutting operation and to bring a succeeding tooth to position for the cutting operation thereon at about the completion of the idle movement of the tool.

14. In a machine for rounding the ends of gear teeth, a rotatable cutting tool, a rotatable holder therefor, the axis of the tool being eccentric to the axis of the holder whereby the tool is caused to traverse a circular path, the holder having a circular portion, the axis of which is eccentric to the axis of the holder equal to that of the tool and being slightly in advance of that of the tool in respect to the direction of rotation of the holder, means for positioning the gear for the cutting operation and indexing mechanism for a gear adapted to present succeeding teeth thereof for the cutting operation and including a reciprocable bar having arms engaging opposite sides of said circular portion of the holder, the center of the circular portion being in advance of the center of the tooth providing a means for clearing the tool from the tooth at the completion of the cutting operation and to bring a succeeding tooth to cutting position at the completion of the idle part of movement of the tool.

15. In a machine for rounding the ends of gear teeth, a cutting tool, means for moving the tool through a complete circle the diameter of which is substantially equal to the linear pitch of the gear, the tool rounding the end of the tooth during substantially half its circle of movement, means for turning the tool at a certain speed during the cutting half of its movement and an accelerated speed during the remaining half of its movement, and indexing means for the gear operating slightly in advance of the completion of the cutting movement of the tool to free the tooth operated upon and to bring a succeeding tooth to cutting position just previous to completion of the idle half circle of movement of the tool.

16. In a machine for rounding the ends of gear teeth, a rotatable cutting tool, a rotatable holder therefor, the axis of the tool being eccentric to the axis of the holder whereby the tool is made to traverse a circular path, means for positioning a gear with a tooth thereof on the extended axis of rotation of the holder, the tool being of conical shape, means for positioning the gear with the axis thereof in a fixed relation to the tool and with the plane occupied by the side of the gear at an angle to or parallel with the cutting face of the tool.

17. In a machine for rounding the ends of gear teeth, a cutting tool, means for turning the tool about a circle, the diameter of which is approximately equal to the linear pitch of the gear, means for positioning the gear with a tooth thereof in relation for the cutting operation, the extended axis about which the tool is turned passing through the tooth between the ends, and means for varying the angle of presentation of the tooth to the tool.

18. In a machine for rounding the ends of gear teeth, a cutting tool, means for causing the tool to traverse a circular path, the diameter of which is approximately equal to the linear pitch of the gear, a gear supporting spindle adapted to hold the gear during the cutting operation in axially fixed relation to the tool, means for varying the angle of the spindle and thereby varying the angle of presentation of the gear to the tool, the tool passing between adjacent teeth on completion of the cutting operation, and means for indexing the gear to correspond with the movement of the tool prior to a succeeding operation.

19. In a machine for rounding the ends of gear teeth, a base, the vertical side thereof being provided with ways, a table adjustable in a vertical plane on the said ways, means for supporting a gear on the table, the table having a part adapted to be set at an angle to the vertical to vary the angle at which the gear is positioned, a head on the said base, means for adjusting the head horizontally, a rotatable cutting tool, a rotatable holder therefor in the said head, the adjustment of the head permitting variation in the position of the tool relative to the said gear supporting table, the axis of the tool being eccentric to the axis of rotation of the holder whereby the tool is made to traverse a circular path about the end of the gear tooth, the cutting operation of the tool being performed during practically one-half its circular path, and means for indexing the gear during the period the tool is traversing the remaining half of its circle.

20. In a machine for rounding the ends of gear teeth, a base, the vertical side thereof being provided with ways, a gear supporting table adjustable in a vertical plane on the said ways, a gear supporting spindle on the table, the table having a part to which the spindle is attached adapted to be set at an angle to vary the position relative to a horizontal plane, a head horizontally adjustable on the said base, a rotatable cutting tool supported in the head at an angle to the vertical, means for causing the tool to traverse a circular path about the end of a gear tooth, the gear being positioned with a tooth thereof for operation by the cutting tool during a part of its movement, and means for indexing the gear subsequent to each cutting operation.

21. In a machine for rounding the ends of gear teeth, a base, a head supported thereon, a gear supporting table vertically movable on the base, the table being of a character to vary the angle of the axis of the gear relative to the horizontal, a rotatable cutting tool and a rotatable holder therefor mounted in the head, the axis of rotation of the tool being eccentric to the axis of rotation of the holder whereby the tool is made to traverse a circular path, driving means for the tool and for the holder rotatable on the axis of the tool, a motor for actuating the said driving means, a base for the motor and driving mechanism, a bearing on the said motor base in which the tool and holder are rotatably mounted, the said base being mounted on the head at one end in a manner to permit movement thereof to correspond with the circular movement of the cutting tool.

22. In a machine for rounding the ends of gear teeth, a base having a head, a gear supporting table vertically adjustable by means of which a gear may be positioned, a cutting tool, a rotatable holder therefor mounted in the said head, the tool being eccentric to the axis of rotation of the holder whereby rotation of the holder causes the tool to traverse a circular path, a driving shaft for the cutting tool extending through the holder, the holder having a terminal portion concentric with the shaft, rotatable driving members for the shaft and the holder mounted on the said shaft and concentric extension of the holder respectively, a motor for driving the said members, and a base for the motor having a bearing member for the said concentric portion of the holder whereby the motor base is given an oscillatory motion, the driving mechanism being carried in fixed relation with the said rotatable driving members.

23. In a machine for rounding the ends of gear teeth, a cutting tool, means for causing the tool to traverse a circular path of a diameter approximately equal to the linear pitch of the gear to be operated on, means for holding the gear with the axis thereof in fixed relation to the tool, the extended axis of rotation of the tool passing through the tooth between the ends thereof, the tool on completing the cutting movement passing between the said tooth and an adjacent tooth, indexing mechanism for the said gear of a character to turn the gear and clear the tool from the tooth as the tool completes the cutting movement, the indexing mechanism being actuated to cause the gear to turn to correspond with the speed of advancement of the tool during its idle movement, and means for positioning the gear with the adjacent tooth in cutting relation to the tool at the completion of its idle movement.

24. In a machine for rounding the ends of gear teeth, a rotatable cutting toool, a rotatable holder therefor, the axis of rotation of the tool being eccentric to the axis of rotation of the holder whereby the tool is caused to traverse a circular path, means for positioning the gear with the axis thereof in fixed relation to the tool, and indexing mechanism for the gear consisting of a circular portion of the holder, the axis of which is eccentric to the axis of rotation of the holder to an extent equal to that of the tool and the center of said circular portion, in respect to the direction of rotation of the holder, being slightly forward of the axis of rotation of the tool, a reciprocable bar having arms engaging opposite sides of the said circular portion, and a pawl on the said bar engaging the gear of a character to turn the same on movement of the bar in one direction and release therefrom on reverse movement, a holder or retainer for the gear movable to engage the same on completion of the turn of the gear by the pawl, the described relationship of the said circular portion and axis of the tool causing the tooth to clear the tool upon completion of the cutting movement and the eccentricity of the said portion causing movement of the pawl strictly in accordance with the speed of advancement of the tool during its idle movement.

25. In a machine for rounding the ends of gear teeth, a cutting tool, means for turning the tool through a complete circle, means for varying the position of the tool to vary the diameter of its path of movement, means for positioning the gear with the axis thereof at any one of various angles to the axis of the circle traversed by the tool, and a retainer engaging the gear tooth and fixedly holding the gear during the cutting operation.

26. In a machine for rounding the ends of gear teeth, a cutting tool, a rotatable holder therefor, the tool being adjustable eccentrically to the axis of rotation of the holder whereby it is made to traverse a complete circle, a gear holder on which the gear is rotatably adapted to position a tooth with the end thereof in a plane parallel with or at an angle to the plane occupied by the axis of the holder and within the path of movement of the tool whereby the same is rounded by the tool during a part of its movement, a retainer with which a gear tooth engages during the cutting movement of the tool, automatic means for disengaging the gear and retainer subsequent to the cutting operation, and automatic means for indexing the gear upon disengagement of the gear and retainer.

27. In a machine for rounding the ends of gear teeth, the combination with a revolving cutter adapted to engage the ends of the teeth, of means for moving said cutter through an arc from one side of the tooth to its other side and gear indexing means operated by said cutter moving means previous to the completion of the cutting movement of the tool on one tooth and to fix the succeeding tooth in cutting position previous to the beginning of the succeeding cutting movement of the tool.

28. In a machine for rounding the ends of gear teeth, a rotatable cutting tool having a driving shaft, a supporting member for the said shaft, a holder for the support, means for adjusting the holder in the support to vary the eccentric relationship of the axis of the shaft and tool relative to the axis of rotation of the holder to vary the diameter of the circular path of movement of the tool to correspond with that of the linear pitch of the gear to be operated on, the tool rounding the end of the tooth during substantially half of its circular path and passing between adjacent teeth on completion of the cutting operation, means for indexing the gear to correspond with the movement of the tool during the remainder of its path of movement consisting of a circular portion formed on the said tool support, the center of which is the same distance as the tool from the axis of rotation of the holder, the said center being slightly in advance of the center of rotation of the tool in respect to the direction of rotation of the holder, a bar having arms engaging opposite sides of the said circular portion whereby rotation of the said portion through its path of movement causes reciprocation of the bar, a pawl on the bar engaging the gear teeth turning the gear just previous to the time the cutter completes its half circle of the cutting movement to clear the tooth from the tool and thereafter moving the gear to correspond with the speed of movement of the tool in completing the idle half of its movement, and means for holding the gear in fixed relation with the tool during the cutting operation.

29. In a machine for rounding the ends of gear teeth, a rotatable cutting tool having a driving shaft, a support for the shaft and tool, a rotatable holder for the said support, the support being adjustable radially of the holder to adjust the eccentric relation of the tool to the axis of rotation of the holder, the support having a circular portion thereon, the center of which in respect to rotation of the holder is slightly forward of the center of the axis of rotation of the tool, the said center of a circular portion and axis of the tool circumscribing the same circular path, and an indexing mechanism controlled by the said circular portion to turn the gear as the tool completes its cutting movement to clear the tooth from the tool and thereafter turn the gear at a speed corresponding with the movement of the tool in completing its path of movement.

30. In a machine for rounding the ends of gear teeth, a rotatable cutting tool, means for causing the tool to traverse a complete circle, means for adjusting the tool to vary the diameter of its circle of movement, means for positioning a gear with the end of a tooth to be operated on in the path of movement of the tool, the tool passing from a space between teeth, around the end of a tooth to the next space between adjacent teeth and indexing means for the gear operating to free the tool from the tooth just as it completes the cutting movement, to move the gear with the tool during most of its idle period of movement, and to bring the next tooth to cutting position just previous to completion of the idle movement of the tool.

31. In a machine for rounding the ends of gear teeth, a cutting tool rotatable on its own axis, automatic means for turning the rotating tool through a complete circle, means for adjusting the position of the tool to vary the diameter of its path of movement, means for positioning the gear with the end of the tooth to be operated on in a plane parallel with or at an angle to the plane occupied by the axis of the circle traversed by the tool, and an automatic indexing device for the gear.

In testimony whereof, I sign this specification.

PHILIP S. ARNOLD.